United States Patent [19]
Smith et al.

[11] Patent Number: 5,377,814
[45] Date of Patent: Jan. 3, 1995

[54] TRANSPORT CARRIER FOR USE IN AN ARTICLE SORTING SYSTEM

[75] Inventors: Barry W. Smith, Dallas; Michael W. Freitas, Irving, both of Tex.

[73] Assignee: Fabri-Check, Inc., Dallas, Tex.

[21] Appl. No.: 807,730

[22] Filed: Dec. 16, 1991

Related U.S. Application Data

[63] Continuation-in-part of Ser. No. 541,282, Jun. 20, 1990, Pat. No. 5,072,822.

[51] Int. Cl.$^6$ ............................................. B65G 47/34
[52] U.S. Cl. ............................... 198/465.4; 198/687.1; 209/937
[58] Field of Search ................. 198/349, 349.8, 349.95, 198/350, 358, 359, 360, 362, 465.4, 687.1; 209/3.1, 3.3, 563, 564, 583, 900, 937

[56] References Cited

U.S. PATENT DOCUMENTS

| | | | |
|---|---|---|---|
| 3,051,096 | 8/1962 | Walsh et al. | 198/687.1 |
| 3,563,395 | 2/1971 | Gary | 198/349.95 |
| 3,850,280 | 11/1974 | Ohrnell | 198/687.1 |
| 3,884,370 | 5/1975 | Bradshaw et al. | 214/11 R |
| 4,053,741 | 10/1977 | Ainoya et al. | 364/478 |
| 4,098,195 | 7/1978 | Zander | 198/465.4 X |
| 4,106,636 | 8/1978 | Ouimet et al. | 214/11 R |
| 4,239,435 | 12/1980 | Weiss et al. | 414/136 |
| 4,249,661 | 2/1981 | Lem | 209/564 |
| 4,479,187 | 10/1984 | Nara | 364/478 |
| 4,566,595 | 1/1986 | Fustier | 209/564 |
| 4,597,495 | 7/1986 | Knosby | 209/3.3 |
| 4,736,687 | 4/1988 | Grube et al. | 198/349 X |
| 4,766,547 | 8/1988 | Modery et al. | 364/478 |
| 4,875,416 | 10/1989 | Duce | 104/167 |
| 4,939,999 | 7/1990 | Burt et al. | 198/465.4 X |
| 4,977,996 | 12/1990 | Duce | 198/349.95 |
| 4,993,539 | 2/1991 | Duce | 198/659 |
| 5,056,438 | 10/1991 | Nozaki et al. | 198/349 X |
| 5,072,822 | 12/1991 | Smith | 198/349 |
| 5,103,737 | 4/1992 | Iwase | 198/360 X |

FOREIGN PATENT DOCUMENTS

0372906  6/1990  European Pat. Off. ............ 209/937

Primary Examiner—Joseph E. Valenza
Assistant Examiner—Tuan N. Nguyen
Attorney, Agent, or Firm—Richards, Medlock & Andrews

[57] ABSTRACT

A sorting system in which uniquely coded garments are hung on transport carriers, also having unique identification bar codes. The garment transport carriers include a connector for removably attaching garments or garment hangers and a hook which engages the transport rails so that the carrier can be moved along the rails and throughout the sorting system. Such a hook is used with slick-type rails, screw-type conveyor rails and even channel-type rails, or a rotatable wheel may be mounted on the carrier for movement of the carrier along rails, including channel-type rails. The transport carrier bar code is read as it progresses through the sorting system and is compared with a computer data base of garment information to determine the sorting route. The garment identification is initially correlated in the computer data base before sorting with the carrier identification code. Once all garment carriers and associated garments of a lot have been identified and correlated by the computer, an algorithm is carried out for assigning a sort value to each carrier. A master distributor switch then distributes the garment carriers a first time to a plurality of sort paths based upon a least significant digit of the sort value. Second and subsequent digits of the sort value of each carrier are employed to recirculate and resort the garment carriers to the plural sort paths to complete the sorting operation with the parallel paths. The garment carriers are then sequentially released from the parallel sort paths to an exit sort path in a final serial order representative of the order of the garments desired by the customers.

4 Claims, 7 Drawing Sheets

TRANSPORT CARRIER FOR USE IN AN ARTICLE SORTING SYSTEM

RELATED APPLICATION

This application is a continuation-in-part patent application of U.S. patent application Ser. No. 541,282 which was filed on Jun. 20, 1990 and entitled "Article Sorting System," now U.S. Pat. No. 5,072,822.

TECHNICAL FIELD OF THE INVENTION

The present invention relates in general to systems for sorting articles according to predefined sequences, and more particularly to a computerized system employing parallel sorting paths in which sort values are assigned by the computer to the articles so that the articles can undergo multiple sort passes through the paths in a manner correlated to the sort values. The invention further relates to a transport carrier for use in an article sorting system of the type having a transport rail for movement of multiple transport carriers.

BACKGROUND OF THE INVENTION

Article sorting systems are generally well known in the art and have become specialized to sort or separate specific types of articles. For example, U.S. Pat. Nos. 3,884,370 and 4,106,636 disclose systems for sorting letters and other types of flat articles. In U.S. Pat. No. 4,249,661, a system is disclosed for circulating objects around workstations so that such objects are available for carrying out different operations thereon. U.S. Pat. No. 4,766,547 discloses a system which is adapted for utilizing handling vehicles traveling along a conveyor network. The vehicles are self-propelled and controlled as to speed and other parameters by a computer system. The sorting system disclosed in U.S. Pat. No. 4,239,435 is especially adapted for sorting clean laundry which is mixed as to customers, types of laundry, delivery routes, etc.

Many sorting systems are inflexible, in that changes in the mode of sorting, or other parameters, are not easily modified. Other sorting systems are highly mechanical in nature, are complicated and are prone to damage and wear. Other systems are simply inefficient, in that they require complicated routing and sorting paths and equipment to accomplish a final arrangement of the articles. For example, in U.S. Pat. No. 4,239,435 identified above, the system labels locations on a looped conveyor and relates specific articles to sort to a location. If the loop has a capacity of 1000 garments the following problems can occur: 1) there is inefficient use of space because the garment density is very low, 2) the system cannot handle more than 1,000 garments in a lot and cannot be easily altered, 3) if an operator hanging garments misses one slot, the entire sort is thrown off and must be redone, 4) it takes nearly as long to sort 100 garments as 1000 garments, 5) and as the system capacity is expanded sorting time does not increase in a linear fashion making it very difficult to handle garment sort lots of, for example, 15,000 pieces.

Also, articles such as garments, are very difficult to identify and to achieve identification throughout the system so that effective sorting can be accomplished. This can be appreciated as the identity of a garment cannot simply be stamped on an outer visible surface thereof, but is often fixed at a location such as an inside cuff or collar, which is normally not readily visible. Also, when garments are hung on a conventional slick rail or screw conveyor, entanglement of either the garments or the garment hangers is a problem which frustrates the automatic identification and transport thereof.

From the foregoing, it can be seen that a need exists for an article sorting system which is highly flexible in that any sorting criteria can be carried out, and little space is required of such system. Another need exists for a sorting system especially well adapted for sorting garments and efficiently transporting the garments through the various paths of the sorting system. Another need exists for a flexible sorting system in which a wide variety of sorting paths can be utilized in a tradeoff between space and sorting time, while yet maintaining the same efficient sorting scheme. A still further need exists for a garment or article transport carrier which allows for easy identification and which facilitates secure movement of a garment through a sorting systems.

SUMMARY OF THE INVENTION

In accordance with the invention, there is disclosed computer-controlled sorting apparatus which is highly efficient as to equipment, space and sorting time.

In accordance with the preferred form, the invention is adapted for sorting garments, each having associated therewith a unique identity. Further, a garment transport carrier, or trolley, also has a unique trolley number, and which carries a garment throughout the various routes of a garment sorting system. For each garment to be sorted, there is initially generated a computer record which identifies all the pertinent information about the garments in a lot. A lot comprises any group of garments to be arranged from a random input order to a specific requested order. Before entry into the sorting system, an operator scans both the garment identification code and the trolley identification code, which code are then stored by a computer. The computer maintains a correlation between the codes during the sorting operation. Once all the trolleys and associated garments comprising a lot are introduced into the sorting system, the operator selects a desired final sequence (by customer/employee, or by type of garment, for example). The computer arranges the computer sort records created for the lot into the same sequence that the operator requires the garments to be sorted, then assigns a "sort value" to each computer record, and by inference assigns the sort value to each trolley and to the garment associated with the trolley. The sorting system of the invention then sequentially scans the trolleys and selects a specific sort path for each trolley by referring to the sort record created by the computer for each specific trolley.

The sorting system includes an entry transport system or rail on which each trolley and associated garment is introduced. A master distribution switch is computer controlled to switch garment trolleys from the entry transport system to one of a plurality of sorting transport systems or rails. The sorting transport systems comprise downwardly inclined rails which are arranged in parallel paths to receive garment trolleys switched thereon from the master distributor switch. Once a lot is sorted according to a first pass on the parallel sorting transport rails, branching switches are selectively operated by the computer for recirculating the garment trolleys from the lower ends of the parallel sorting transport rails back to the entry transport rail for subsequent sorting passes.

The sort value assigned by the computer to each garment trolley is a multi-digit number, in which the least significant digit identifies the particular parallel rail on which the trolley is to be distributed during the first sorting pass. The next significant digit of the sort value identifies the particular parallel rail on which the trolley is to be distributed during the second sorting pass, and so on. With such a system, sorting is carried out according to the relationship $R^n$ or where R equals the number of sorting transport rails, and n is equal to the number of recirculation passes through the system based upon the number of garment trolleys to be sorted. In a system having ten sorting transport rails, a thousand garments can be sorted in three recirculated sorting passes.

After sorting operation is essentially completed on the last of multiple passes, the garments are arranged in the requested or desired sequence on the parallel sorting transport rails. The branching switches located at the lower end of the sorting rails can then be sequentially operated to allow the garment trolleys to proceed in series to a separation station where the garments are separated from the trolleys. The release of the garment trolleys from the parallel sorting transport rails comprises a final sort step, in that the garments are released in a particular order so that when they arrive at the separation station, the order of the garments comply with that specified by the sort algorithm selected by the operator.

The garment trolley of the invention includes a frame to which a wheel is rotatably mounted. The wheeled trolley can then be pushed or rolled by the action of gravity from the entry transport rail and distributed to one of the parallel sorting transport rails. The frame part of the trolley includes a peg to which a wire-type garment hanger can be suspended for carrying the garment. Further, the garment trolley can also include a hook so that it alone, or with the garment, can be transported uphill by screw conveyors, or the like. A bar code label is fixed to each garment trolley to uniquely identify each such trolley, as well as provide an expedient technique for identification as the trolley rolls past an identity scanning device.

Alternatively, the garment trolley of the present invention includes a frame to which a hook is attached or fixed. This hook is used to move the carrier throughout the system along either slick rails or screw conveyors. The frame of the trolley includes a connector for securing the garment, such as a plurality of fingers formed to receive a garment hanger. A unique identifier is fixed to each garment trolley to uniquely identify each such trolley, as well as provide an expedient technique for identification as the trolley rolls past an identity scanning device. Such an identifier may be a bar code label, frequency signal generator or the like.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, element or functions throughout the views, and in which.

DETAILED DESCRIPTION OF THE INVENTION

Figure 1:
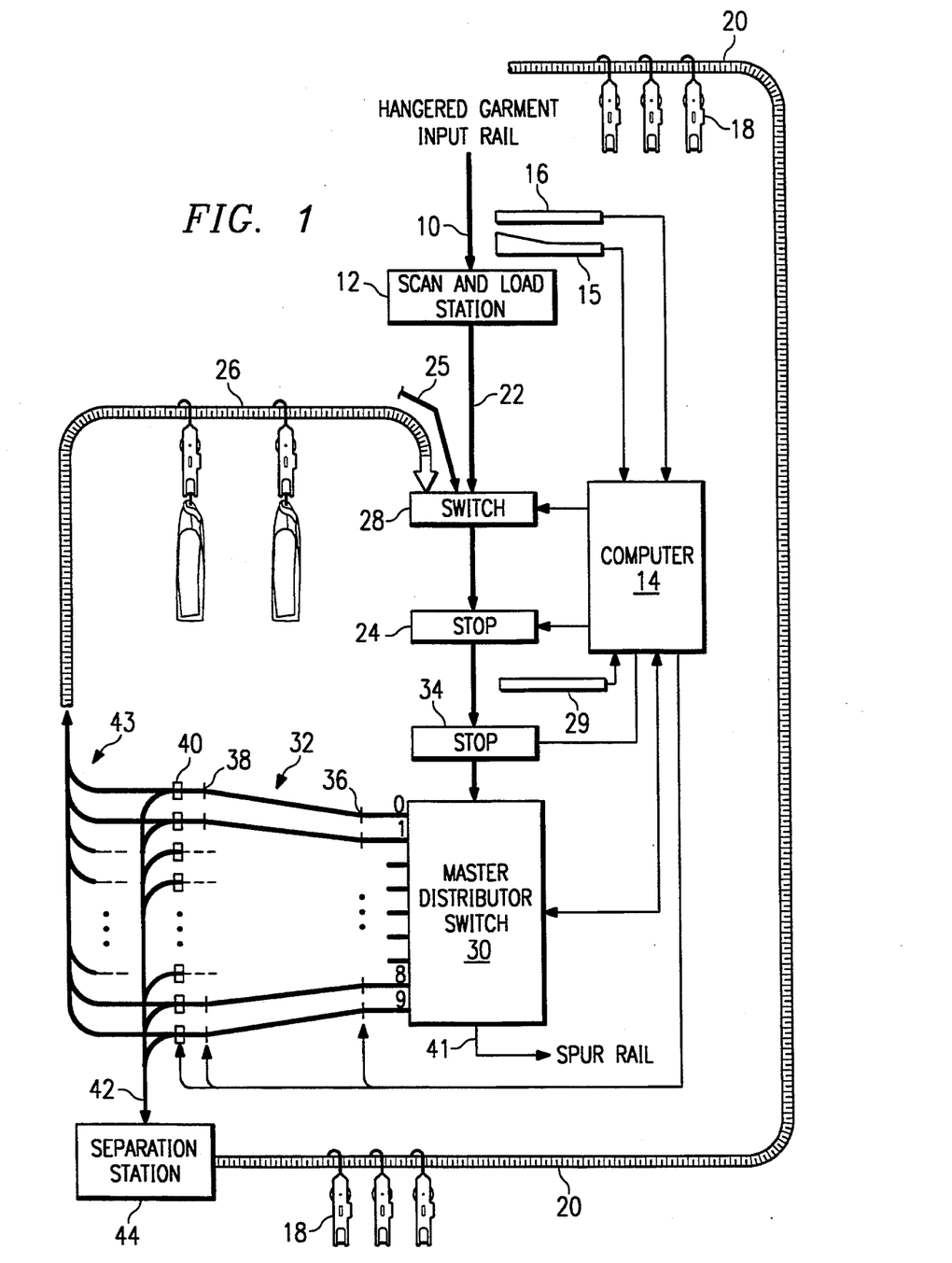
FIG. 1 is a generalized functional diagram of the article sorting system of the invention.

FIG. 1 diagrammatically illustrates the article sorting system of the invention, particularly adapted for sorting garments. However, it should be realized that the principles and concepts of the invention are not restricted to the sorting of garments, but can be employed in many other and different types of environments with a vast variety of articles.

The system according to the preferred embodiment of the invention includes an input transport rail 10 for transporting clean, but unsorted garments to the sorting system. The input transport rail 10 may be a slick rail, screw-type rail or other type of transport mechanism for conveying hangered articles to the sorting system. The input transport rail 10 terminates at a scan and load station 12 which may be manual, but is contemplated to be automatically operated for transferring hangered garments to the trolleys 18. The scan and load station 12 defines a station for inputting identification information into a computer 14 that controls the sorting system. Information input into the computer 14 can be by way of a keyboard 15, but preferably is by way of a scanning device, such as a light wand 16 of the type for reading bar codes. Each garment presented to the scan and load station 12 has attached thereto prior to laundering a permanent unique identification code. The code can be a bar code label permanently fastened to a surface of the garment which is not normally visible when worn. By passing the scanning device 16 across the garment bar code label, such information is input into the computer 14. As the garment identity is input into the computer 14, the hangered garment is hung onto a garment trolley, one of which is shown as reference numeral 18. Unused garment trolleys 18 are supplied to the scan and load station 12 on a return empty trolley rail 20, shown as a screw type. Importantly, each garment trolley 18 also includes a permanent unique identity which is preferably also of the bar code type. The garments and trolleys have different codes so that the computer 14 can differentiate or distinguish the garments from the trolleys. The garment and trolley codes can differ in many ways, including code length, code symbology, or different data within the codes. By scanning both the garment bar code label and the trolley bar code, the computer 14 can associate such identities, and can thereafter perform sorting operations on the garment trolley 18 alone.

Subsequent to the entry of the garment and trolley identification numbers into the computer 14, the trolley 18 and attached garment pass to an entry transport rail 22. The entry transport rail 22 can be sloped so that the garment trolleys advance downhill, away from the scan and load station 12. An upper stop 24 is located at the bottom of the entry transport rail 22 to prevent further movement until all garments in a lot have been loaded on trolleys 18 and the identification numbers thereof entered into the computer 14. To be described in more detail below, a screw-type resort transport rail 26 is also switchably connected to the entry transport rail 22 by a converging switch 28. The switch 28 is controlled by the computer 14 so that incompletely sorted garments can be recirculated by the resort transport rail 26 and again directed to the entry transport rail 22 for subsequent sorting passes through the system. A major portion of the resort transport rail 26 may be of the screw-type for transporting trolleys and attached garments in an upwardly inclined manner to the input of the system. Rather than employing the converging switch 28, the garment trolleys at the end of the resort transport rail 26 could be manually transferred to the entry transport rail 22. The converging switch 28 is a standard two-way or three-way rail switch that is electrically operated.

Since each garment trolley is scanned and identified before presentation to the master distribution switch 30, a second switched input 25 to the converging switch 28 can be employed. Of course, the garment trolleys switched from entry rail 25 would have to have been previously associated with garment identities and entered into the computer 14. The garments switched from rail 25 would also comprise part of the lot. When employing the switched input 25, the switch would be a three-way switch.

After all trolleys and associated garments of a lot have been queued on the entry transport rail 22, the operator signals the computer 14 by way of the keyboard 15, or otherwise, to indicate a complete lot. The operator at the scan and load station can also enter by way of the keyboard 15 the sort algorithm or scheme which should be carried out for sorting the garments. Of course, those skilled in the art can readily devise computer programs which are capable of prompting the operator at the scan and load station 12 as to various sort sequences so that sufficient information is input into the computer 14 to enable it to carry out a sort algorithm. For example, the operator at the scan and load station 12 may sort garments in the sequence in which deliveries are to be made. Further, a sort sequence may specify that for each delivery stop, shirts, pants, uniforms, etc., are to be in a specified order, and further that color or other garment parameters can be sorted. A host of sort criteria can be employed to sort the garments in any predefined manner.

To be described in more detail below, once the lot is complete on the entry rail 22, the computer 14 processes the garment records, the garment identity and the trolley identity, and as a result assigns to each garment trolley 18 a sort value. The garment trolleys 18 then roll or slide on rail 22 through switch 28 to the upper stop 24.

The upper stop 24 can be momentarily operated by the computer 14 to allow the passage thereby of the foremost garment trolley 18. A lower stop 34 then stops advancement of the trolley 18. The foremost garment trolley is scanned as to trolley number by the fixed scanner 29. As can be appreciated, the scanners 16 and 29 can be conventional optical scanners, laser scanners, CCD image scanners, infrared scanners, or other suitable scanning mechanisms. After the garment trolley identity has been input into the computer 14 by the fixed scanner 29, and is released by the lower stop 34, the computer 14 drives a master distribution switch 30 so that the trolley 18 and attached garment can be switched to one of a number of parallel sorting transport rails 32.

In the preferred form of the invention, there are arbitrarily chosen ten sorting transport rails 32, numbered 0–9. Each sorting transport rail 32 is also sloped downwardly to allow the garment trolleys 18 to move under the force of gravity, either by the trolley wheels or the trolley hooks. Further, each sorting transport rail 32 includes an upper stop 36, a lower stop 38 and a branching switch 40. The branching switch 40 is preferably a standard two-way slick rail switch. As will be described more fully below, the upper stop 36 is effective to separate different recirculations of a sort, and the lower stop 38 is effective to allow movement of the garment trolleys 18 through the branching switch 40. Each branching switch 40 associated with a parallel sorting transport rail 32 is adapted for allowing the garment trolleys 18 to proceed either to the resort transport rail 26, or to an exit transport rail 42. As used herein, the sorting transport rails are not actually parallel in the geometric sense, but are different paths to which the garment trolleys 18 can be switched.

The master distributor switch 30 can also be operated by the computer 14 to switch selected garment trolleys 18 to a spur rail 41. Garments in need of repair or garments which are to be retired from use can be tagged by the computer 14 so as to be removed from the sorting operation. The identification codes of such types of garments can be entered by an operator into the computer 14 prior to sorting. The computer 14 can be programmed to remove such garments from the sorting steps, and be rerouted to the spur rail 41. While not shown, the garments queued on the spur rail 41 can later be manually scanned to determine the ultimate destination. For example, a CRT can be employed near the spur rail and driven by the computer 14 in response to scanning to return a video message to the operator to transfer the garment to a repair department, or other destination.

During a sort sequence, and depending upon the number of garments to be sorted and the number of parallel sorting rails 32 employed, garment trolleys can be switched by the branching switch 40 to be recirculated via the resort transport rail 26 and again distributed by the master distribution switch 30. After the garment trolleys have been switched and arrayed on the sorting transport rails 32 according to the sort numbers assigned thereto by the computer 14, a final sequencing is achieved by sequentially operating the parallel sort rail switches 40 so that the garment trolleys 18 are released in an orderly manner and arranged in the correct serial sequence on the exit transport rail 42. The sorted garment trolleys on the exit transport rail 42 proceed by gravity or otherwise to a separation station 44 where the garments are removed from the trolleys 18 and loaded onto delivery vehicles for delivery. The separation station 44 can be manual, but preferably is automatic so that hangered garments are removed from the trolleys 18 and the empty trolleys 18 directed to the return empty trolley rail 20. The return empty trolley rail 20 may be of the screw type from which a hooked portion of the garment trolley 18 can be suspended to thereby transport the empty trolleys uphill to the scan and load station 12.

Figure 2A:
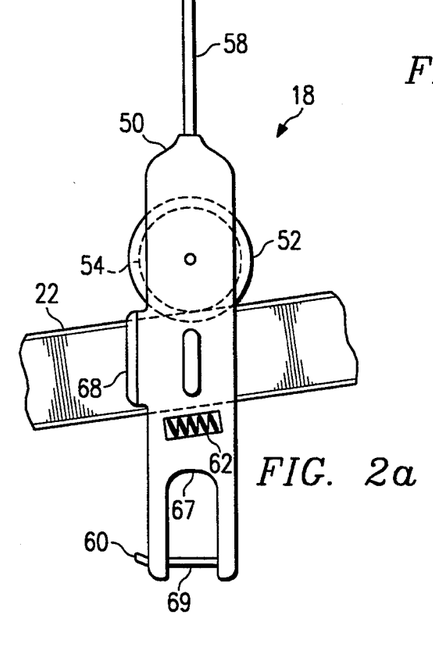
FIGS. 2a-2c illustrate various embodiments of garment trolleys constructed in accordance with the invention.
Figure 2B:
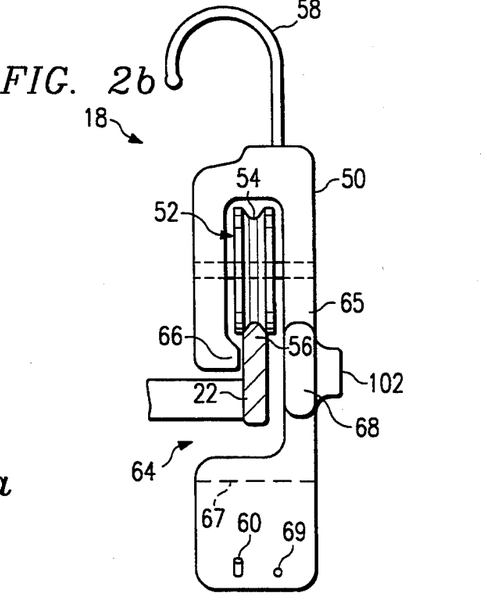

Having described the major functional elements of the article sorting system of the invention, reference is now made to FIGS. 2a and 2b where a garment trolley 18 is shown in more detail. A primary advantage of the trolley carrier of the invention is that garments or articles hung therefrom are not so apt to become tangled, or the hangers becoming entangled. The garment trolley 18 of the invention includes a frame part 50 to which a wheel or roller 52 is rotatably mounted. Preferably, the wheel 52 has a concave peripheral edge 54 for engaging with an upper edge of a transport rail, such as the entry transport rail 22. The diameter of the wheel 52 is preferably about ¾ to 1 inch to provide a compact trolley so that a large number of such things can be arranged on a given length of rail. As noted, the upper edge 56 of the rail 22 has a curvature matching that formed within the peripheral edge 54 of the wheel 52. The garment trolley frame part 50 includes at its upper end thereof a wire hook 58 adapted for hanging the trolley 18 on a screw-type conveyor 20 or 26 for transporting the trolley 18 at upwardly inclined angles. The trolley frame 50 includes at the bottom one or more pegs 60 from which wire garment hangers can be suspended. As noted in FIG. 2a, each garment trolley 18 includes an identification unique thereto, in the form of a bar code label 62. A dot code can also be used. Thus, the trolley 18 can be identified manually by a scanning device 16 being passed across the bar code 62, or as the trolley 18 passes by a fixed scanning device 29. Importantly, the garment trolley 18 eliminates the need to continually read a garment label as the garment passes through the sorting system. Also, the wheeled aspect of the trolley 18 allows for easy, fast and quiet transport. As shown in FIG. 2b, the frame part 50 of the trolley 18 includes an opening 64 so that the trolley can be manually removed from a sorting rail 22. The opening 64 can be larger than shown so that the trolley 18 can pass over rail areas having apparatus attached thereunder, such as trolley stops 24. A further advantage of the garment trolley 18 of the invention is the inclusion of frame side members 65 and 66 which are adjacent opposing sides of the rail 22 to prevent swinging of the trolley 18 and the garment suspended therefrom.

Also formed within the bottom part of the trolley frame 50 is an opening 67 through which a horizontal pin 69 is fixed to also hang one or more garments therefrom. In cases where a number of garments, such as shirts, can be maintained as a group during sorting, all garments of the group can be hung on a single trolley 18. This is advantageous as only a single trolley is processed in the sorting system, rather than a number of garments of the group. Substantial savings in sorting time can thus be realized. The pin 69 is captured at both ends thereof to prevent garments from being jarred from the trolley 18 when the trolleys roll downhill and collide with each other. To that end, the trolley frame 50 also includes a front bumper 68 which is adapted for engaging with the frames of other trolleys. The bumper 68 can be rubber or other material to reduce noise, wear or damage to the trolleys as they are pushed or collide with each other.

The frame part 50 of the garment trolleys 18 can be constructed of aluminum, plastic or other suitable material. The wheel 52 can be rotatably mounted in the frame 50 by a bushing or bearing to increase the life of the trolley 18. The wheel 52 itself can be constructed of a nylon material for durability and low noise factor. The pegs 60 and pin 69 can be press fit, threaded or bonded within a hole in the trolley frame 50.

Figure 2C:
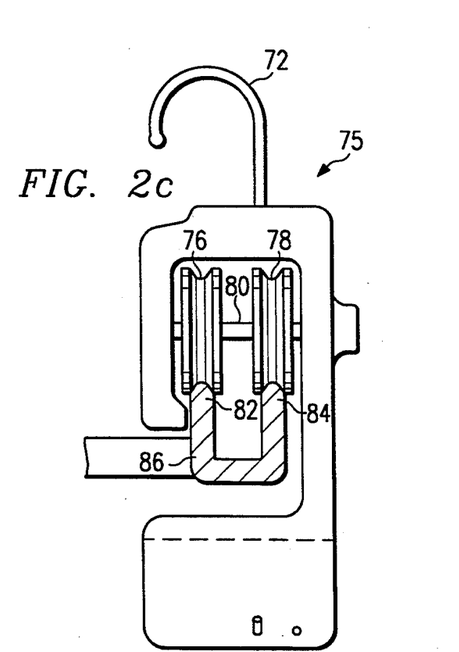

FIG. 2c illustrates yet another embodiment of a trolley 75 having a pair of wheels 76 and 78 rotatably mounted about a common axle 80. The trolley 75 is adapted for rolling along a double rail 86 having two upper edges 82 and 84 engaging with the respective trolley wheels 76 and 78. The trolley 75 is well adapted for stabilization to prevent rotation thereof about the twin rail 86.

Figure 2D:
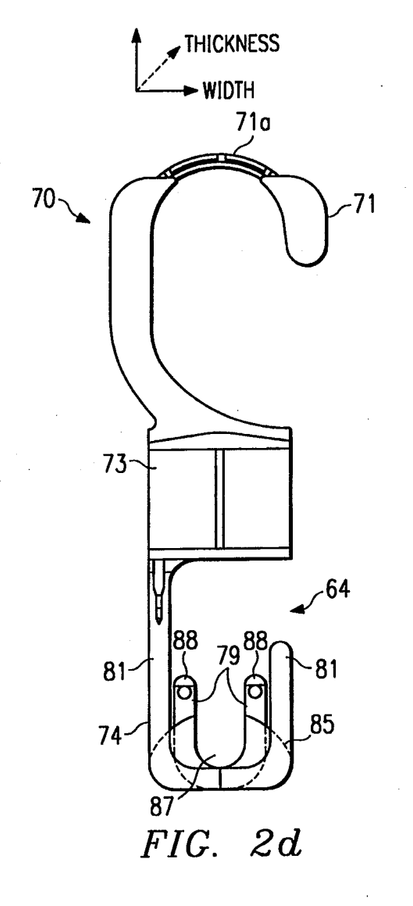
FIGS. 2d-2f illustrate alternative embodiments of a garment transport carrier constructed in accordance with the invention.

FIG. 2d illustrates still yet a further embodiment of a transport carrier trolley 70 having a hook 71 mounted to a frame 73 for movement of the carrier along transport rails and a connector 74 which is also fixed to the frame 73 to which articles can be removably attached. This type of transport carrier can be moved or transported along both screw type conveyor rails against the force of gravity or along slick-type transport rails with the force of gravity. The advantage of a hook-only design is that the trolley carriers can be more densely packed if there is no wheel diameter to accommodate (i.e., the transport carrier is not as thick if there is no wheel attached). In a preferred embodiment, the hook 71 is thinner or has a reduced thickness at its apex 71a, as compared to the overall thickness of the rest of the carrier 70. This reduced thickness makes it easier for the individual carriers 70 to be mechanically separated and removed from a transport rail by providing space at the hook-rail interface area for insertion of a separating device or stop device as described herein. Alternatively, a wheel may be rotatably mounted upon the frame member for moving the transport carrier along a channel-type transport rail, as shown in FIGS. 2a–c.

Each transport carrier 70 may include an identification means 77 unique to that carrier which differentiates or otherwise distinguishes that carrier from other transport carriers. As noted in FIGS. 2d, 2e and 2f, the unique identification 77 may comprise a bar code label aligned as either a picket (vertical) or ladder (horizontal) bar code. If a bar code is used in the ladder orientation, the bar code label may be wrapped completely around the carrier frame 73 to thereby improve the scanner's ability to correctly read the bar code. Alternatively, the unique identification 77 may comprise a radio frequency device which emits a unique signal identifying and distinguishing the particular carrier from other transport carriers. Numerous integrated circuit frequency generating devices are available for generating analog or digital frequency identification signals which can be recognized by a receiver for the article sorting system. These unique identifiers eliminate the need for continual reading of a garment label as the garment passes through a sorting system, and allows for easy, fast and quiet transport.

Figure 2E:
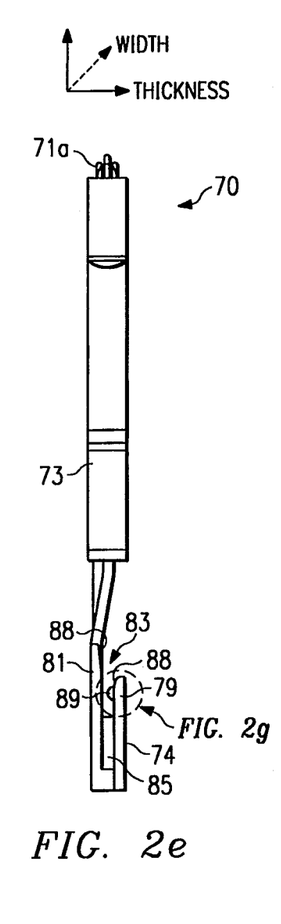
Figure 2F:
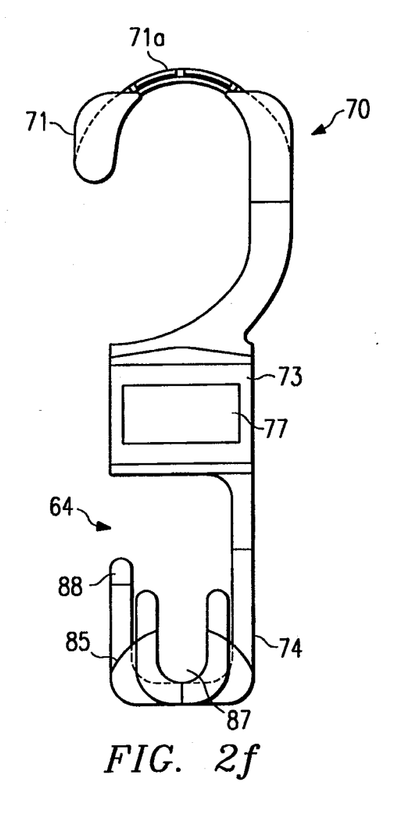
Figure 2G:
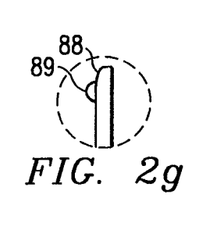

As shown in FIGS. 2d, 2e and 2f, the transport carrier 70 includes a connector 74 which is fixed to the frame 73 and to which articles or article hangers are removably attached. In one embodiment shown in FIG. 2d, a plurality of fingers 79, 81 form the connector 74 with at least one of the fingers being fixed to the frame. The plurality of fingers 79, 81 are aligned to form a receiving area 83, as best seen in FIG. 2e, into which an article hanger may be placed. The plurality of fingers 79, 81 may be aligned in parallel, or may be aligned in any way which creates a receiving area 83 for the article hanger. The plurality of fingers include at least one forefinger 79 (preferably two) and at least one aft finger 81 (preferably two), between which is formed the receiving area 83 for the article hanger. Placement of the article hanger into the receiving area 83 is facilitated when the forefingers 79 are shorter than the aft fingers 81 and especially when one of the aft fingers 81 is the means by which the connector 74 is fixed to the frame 73. The advantage of having longer aft fingers is that article hangers can be more easily inserted into the receiving area by first placing the article hanger against the back or aft finger before lowering the hanger into the receiving area.

It will be appreciated that the present transport carrier 70 may be comprised of separate hook, frame and connector components, but may also be formed of a unitary material, such as molded plastic, rubber or other material. When the transport carrier is formed of a single piece of molded material, a further embodiment of the present invention provides for a configuration of the plurality of fingers 79, 81 which simplifies the molding or part fabrication process. In particular and as shown in FIGS. 2d and 2e (which show a view of the width and thickness of the carrier, respectively), the forefingers 79 and aft fingers 81 (shown in FIG. 2d as superimposed in front of the forefingers) may be aligned in parallel such that the forefingers are aligned in a first width-wise plane which is offset from a second width-wise plane in which the aft fingers are aligned. The offset between the first width-wise plane and the second width-wise plane forms the receiving area 83 into which the article hanger is releasibly secured. As shown in FIG. 2d, this offset area will be formed such that an arced weight-bearing surface 85 receives the article hangers as they are placed into the receiving area 83. With the arced or curved weight bearing surface 85 supporting any inserted article hanger, an opening 87 is thereby formed in the connector 74 between the top of any inserted hanger and the bottom of the connector. With this opening 87, an article hanger can be removed from the transport carrier 70 by inserting a rod into this opening 87, lifting and removing the rod through the opening 64 in the carrier to separate the hanger from the carrier. This particular feature is especially useful when a plurality of transport carriers 70 are aligned and secured such that a single rod may be inserted through each of the transport carrier openings 87 and beneath the hangers placed thereon, and then lifted and removed through the carrier opening 64, thereby separating a plurality of hangers at one time from the carriers so that the plurality of carriers can be returned for recirculation through the sorting system.

Additionally, each of the forefingers 79 and aft fingers 81 may be aligned in a different thickness-wise plane as best seen in FIGS. 2d or 2f. Such a configuration of the fingers allows for simpler fabrication of the part, especially when the part is molded.

In accordance with one embodiment of the present invention, placement of article hangers into the connector is facilitated by forming the plurality of fingers such that each finger has a reduced thickness at receiving end 88 of the finger, as is best seen in FIG. 2e. By forming the fingers so that the tips 88 are tapered, placement of an article hanger into the receiving area 83 is made easier. In addition, nipples 89 may be formed on the fingers for securing the hanger into the receiving area.

Figure 3A:
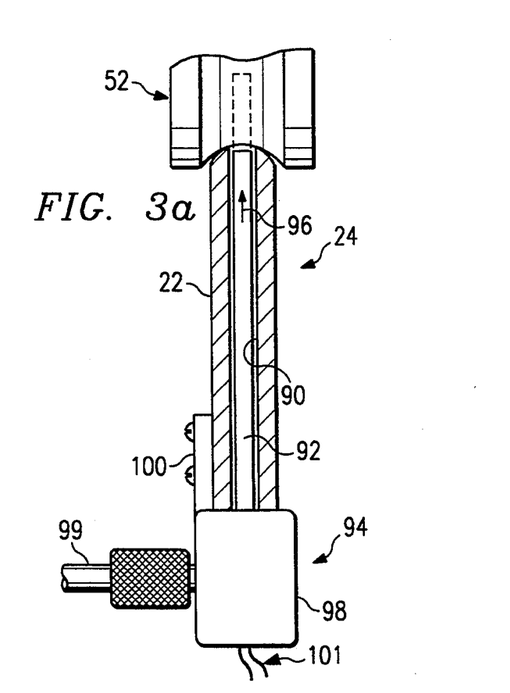
FIGS. 3a-3c illustrate various embodiments of rail stops for halting forward movement of a trolley on a rail.

FIG. 3a illustrates a stop mechanism for halting forward movement of a garment trolley 18 on a sloped rail, such as the entry transport rail 22. A bore 90 is formed vertically within the rail 22 for receiving a plunger 92. The plunger 92 is part of a pneumatic device 94 which is operable in the longitudinal direction, as indicated by arrows 96. The pneumatic device 94 includes internal apparatus which can be pneumatically operated to either force the plunger 92 outwardly, or retract it. Such devices are well known in the art. The pneumatic device 94 includes a frame 98 and a mounting bracket 100 which is adapted for mounting to the side of the rail 22. In its relaxed state when the device 94 is not energized by compressed air, the plunger 92 is retracted so that trolley wheels, such as 52, can roll freely on the top side of the rail 22. When the device 94 is energized by compressed air, the plunger 92 is forced upwardly to the position shown by the broken lines, thereby impeding the forward movement of the trolley wheel 52. A constant supply of compressed air can be delivered to the pneumatic device 94 by tubing 99. The compressed air can be controlled internal to the device 94 by an electrically actuated valve. As can be appreciated, the pneumatic valve conductors 102 can be driven by computer interface circuits to coordinate the movement of the garment trolleys along the entry transport rail 22 as well as the parallel sorting transport rails 32. The stop mechanisms 36 and 38 can be constructed in a manner similar to that shown in FIG. 3a. When utilizing dual rails, one stop mechanism can be used in each such rail.

Figures 3B, 3C:
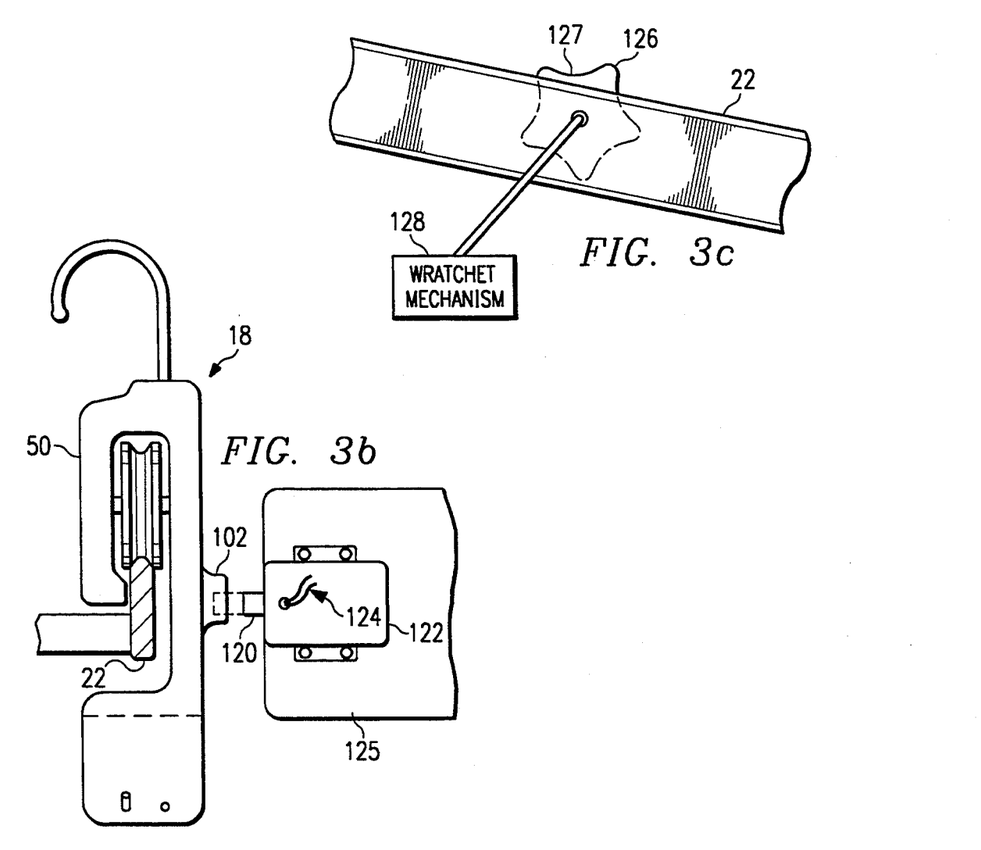

FIG. 3b illustrates yet another embodiment of a stop mechanism for interrupting the forward movement of a garment trolley, shown by numeral 18. In this embodiment, the trolley frame 50 includes a laterally extending ear 102. A plunger 120 of a solenoid 122 can be extended into the path of travel of the trolley ear 102. When the solenoid 122 is energized by current to the conductors 124, the plunger 120 is extended outwardly into engagement with a frontal surface of the trolley ear 102, thereby stopping the trolley 18. The solenoid 122 can be mounted to a frame 125 which is fixed adjacent the rail 22.

FIG. 3c depicts yet another embodiment of a trolley stopping mechanism. Here a sprocket-like wheel 126 is rotated within a slot or opening in the rail 22. The wheel 126 includes a number of concave areas 127 each having a curvature matching that of the outer surface of the trolley wheel. The wheel 126 is rotated incrementally by a ratchet mechanism 128. The sprocket ratchet mechanism 128 maintains the wheel 126 in the position shown in between incremental moves, and then with a snap action, rotates the wheel by one fifth of a turn to carry the trolley to the downside of the transport rail 22. After the snap action movement of the wheel 126 by the ratchet mechanism 128, the next trolley wheel engages within the next concave area 127 of the wheel and is stopped. When the wheel 126 is again rotated under control of the computer 14, the trolley is transferred on the rail and allowed to proceed. It should be appreciates by those skilled in the art that other stop mechanisms can be employed to arrest the forward movement of the garment trolleys 18. For example, hinging stop apparatus can be employed for movement into the path of the trolley and thereby stop the movement thereof. Also, an electromagnet can be energized so as to attract a ferromagnetic part of the trolley frame to arrest its movement.

With reference now to FIGS. 4a–4d, there is illustrated a master distributor switch 30 constructed according to the invention. For purposes of example, illustrated is a U-shaped entry transport rail 130 switchably connected to one of a number of parallel sorting transport rails 32. The sorting transport rails 32 are shown as a slick rail type. A garment trolley 75 of the type shown in FIG. 2c would be utilized on such type of rail 130. The transport rail 130 is shown with side supports 132 for maintaining the rail 130 spatially fixed.

Also shown are spaced apart stop mechanisms 24 and 34 associated with the transport rail 130. The stops 24 and 34 are spaced apart so as to accommodate a single garment trolley 75 therebetween. Also, a scanning device 29 is located so as to be able to scan a garment trolley which is allowed to progress to the lower stop 34.

Figure 4A:
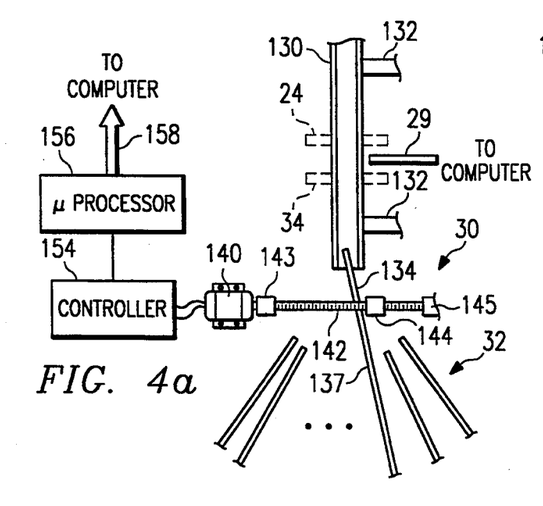
FIGS. 4a-4d are respective top, front end and side views of a master distribution switch of the invention.
Figure 4B:
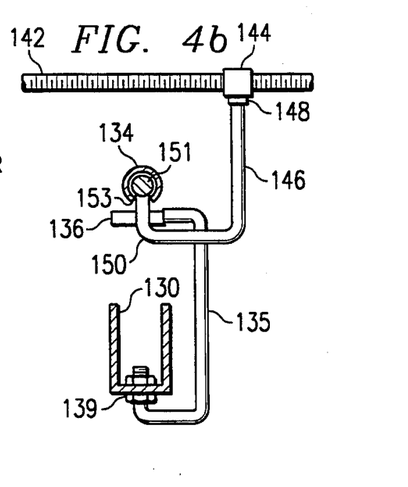
Figures 4C, 4D:
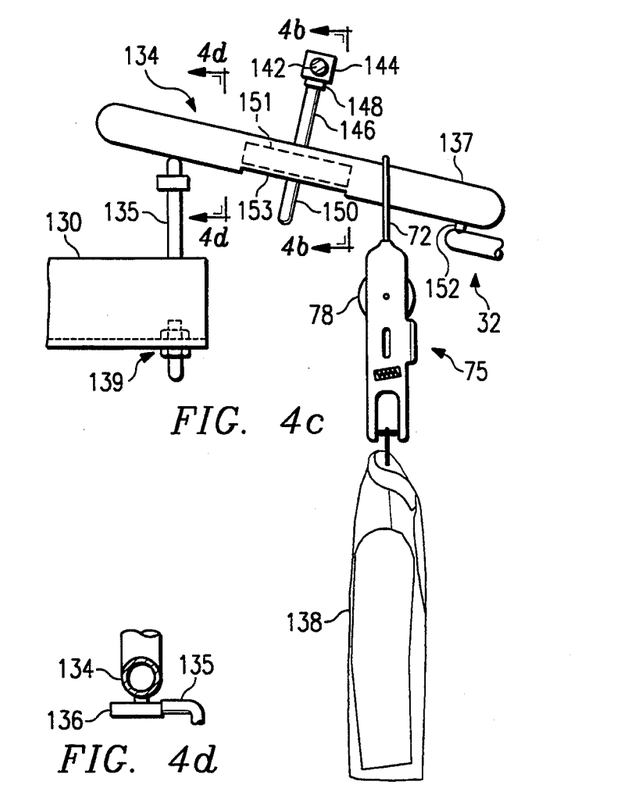

Pivotally attached to the lower end of the U-shaped transport rail 130 is a tubular distributor arm 134. The distributor arm 134 has bearinged on its upper underneath side, a J-shaped support 135. FIG. 4d shows a bearing 136 having an inside race fastened by a short stub to the distributor arm 134. The outer race of the bearing 136 is welded to the upper end of the J-shaped support 135. The J-shaped support 135 has a lower threaded end affixed to the end of the transport rail 130 by a pair of nuts 139. With this structure, the distributor arm 134 can be pivoted about the end of the transport rail 130. As noted in FIGS. 4a and 4d, as the distributor arm 134 is pivoted about the bearing 136, the end 137 of the arm 134 can be disposed adjacent the upper end of any one of the transport rails 32. The upper end of each of the transport rails 32 is anchored in a circular configuration so that as the distributor arm 134 is selectively rotated to different positions, garment trolleys 75 can be distributed from the transport rail 130 to a selected one of the sorting rails 32. As can be appreciated from FIG. 4c, as the wheels 76 and 78 of the dual wheel garment trolleys 75 roll down the U-shaped transport rail 130 and approach the end thereof, the trolley hook 72 becomes disposed over the upper end of the distributor arm 134. Eventually, the wheels 76 and 78 of the garment trolley 75 roll off the lower end of the transport rail 130; whereupon the garment trolley 75 and the attached garment 138 fall downwardly so that the hook 72 engages and slides on the distributor arm 134. The garment trolley 75 and attached garment 138 then slide downwardly on the distributor arm 134 toward one of the transport rails 32. The garment trolley 75 is distributed to one of the sorting transport rails 32, depending on the angular position of the distributor arm 134.

A stepping motor and ball screw arrangement and associated support and linking apparatus is adapted for selectively pivoting the distributor arm 134 to desired arcuate positions to align the end 137 thereof with respect to desired upper ends of the transport sorting rails 32. A stepping motor 140 is connected to an elongate ball screw 142 by an optional universal joint 143. The outer end of the ball screw 142 is supported by a bearing 145 that is fixed within a stationary base (not shown). A block 144 has an internal threaded bore for receiving the threaded ball screw 142. As the ball screw 142 is rotated by the stepping motor 140, the block 144 axially moves along such screw 142. By controlling the stepping motor 140 to rotate in one direction, the block 144 can be moved toward the outer end of the ball screw 142, while rotation of the stepping motor 140 in the opposite direction causes movement of the block 144 in an opposite direction. The block 144 is connected to a J-shaped arm 146 by a bearing 148 which allows the arm 146 to pivot with respect to the block 144. The end 150 of the J-shaped arm 146 is welded or otherwise secured to a short rod 151 which slides within the tubular distributor switch arm 134. The underside of the distributor switch arm 134 has a slotted opening 153 therein through which the J-shaped arm section 150 extends. With this arrangement, rotation of the ball screw 142 is effective to axially move the block 144, as well as the J-shaped arm 146. The movement of the arm 146 and thus the short rod 151 carries with it the distributor arm 134. Movement between the J-shaped arm 146 and the distributor arm 134 is occasioned by slight rotational movement about the bearing 148, and sliding movement of the short rod 151 within the tubular arm 134. Because the upper end of the distributor arm 134 is rotatably anchored with respect to the transport rail 130, the lower end 137 of the arm 134 is free to swing in an arcuate movement with respect to the upper ends of the sorting transport rails 132. It can be appreciated that by rotating the ball screw 142 a prescribed number of revolutions, the end 137 of the distributor arm 134 can be precisely located with respect to a desired one of the sorting transport rails 32.

In order to assure proper registration of the end 137 of the distributor switch arm 134 with respect to the upper ends of the transport rails 32, a microswitch 152 can be fixed to the underside of the distributor arm end 137, as noted in FIG. 4c. The microswitch 152 can have an actuation lever depending downwardly to cam across the upper end of the sorting transport rails 32, thereby sensing proximity thereof. The electrical conductors of the microswitch 152 can be routed inside the tubular distributor arm 134, along the tubular J-shaped arm 146 and to a controller 154. The controller 154 includes motor control circuits for driving the stepping motor 140 a prescribed number of revolutions in response to instructions from the computer 14.

The controller 154 is controlled by a microprocessor 156 which receives instructions via a transmission bus 158 from the computer 14. The controller 154 also includes conventional circuits for responding to actuations of the microswitch 152 to sense the position of the distributor arm 134 with respect to the sorting transport rails 32. It is contemplated that the computer 14 will transmit high level instructions to the microprocessor 156 for selectively moving the distributor switch arm 134 and thereby distribute garment trolleys 75 from the transport rail 130 to a desired one of the sorting rails 32. One additional rail of the group 32 can function as a spur rail 41, as described above. Stepping motors and ball screws adapted for operation of the type noted are identified as type PH266-01B (stepping motor) and U1 215GA (ball screw), both obtaining from Texonics, Inc.

Figure 5:
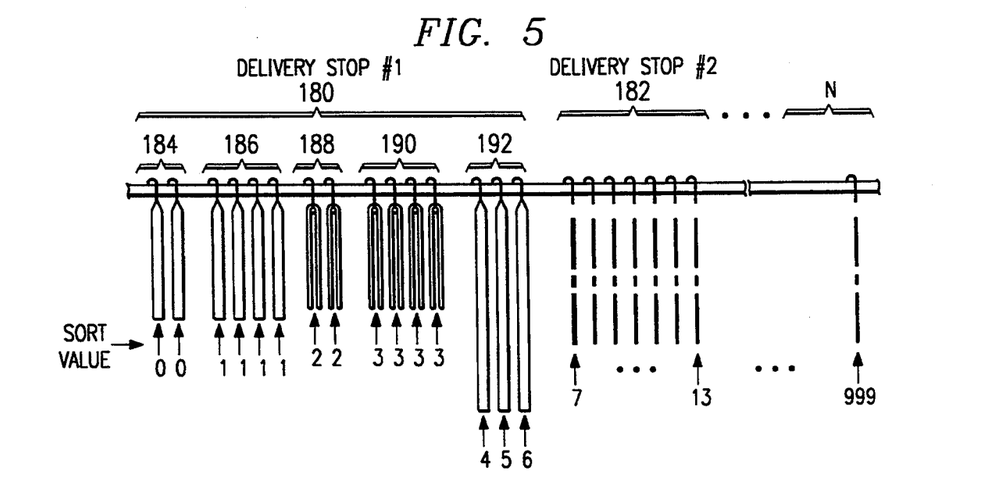
FIG. 5 is a side plan view of a number of garments arranged in a final order, and illustrating associated sort values.

For ease of understanding the sorting function provided by the invention, reference is made to FIG. 5 which illustrates garments arranged in a sequence as a result of sorting according to the invention. As noted above, and according to an example, garments can be first sorted according to customer stop numbers so that groups of garments can be loaded in a delivery vehicle in the manner in which they will be delivered. Furthermore, the garments of each customer can be arranged in the sequence desired by the customers. Shown is a group 180 of garments which are to be delivered at the first delivery stop. Other garments to be delivered at a second stop would also be sorted and arranged in series behind the first group 180. The second stop garments are identified by reference numeral 182. Any number of garments for any number of stops can be sorted.

With particular reference to the garments of the first delivery stop 180, it may be desired to arrange a group of shirts 184 so as to be separate from a second group of shirts 186. Shirt group 184 may be for one department of customer employees, while shirt group 186 may be for another department. Indeed, each shirt in group 186 can be individually sorted to be placed in a desired sequence, such as by color or employee. Similarly, pant groups 188 and 190 may be sorted separately. Lastly, and for purposes of example, other garments, such as full-length uniforms may be sorted as a separate group 192. The garments of the second group 182 can be sorted in an entirely different manner, and may be in a different sequence than that shown for the first delivery stop 180. Preferably, the computer 14 is programmed to identify the different delivery stops, or customers, and arrange the garments in the manner desired by the customer.

Figure 6:
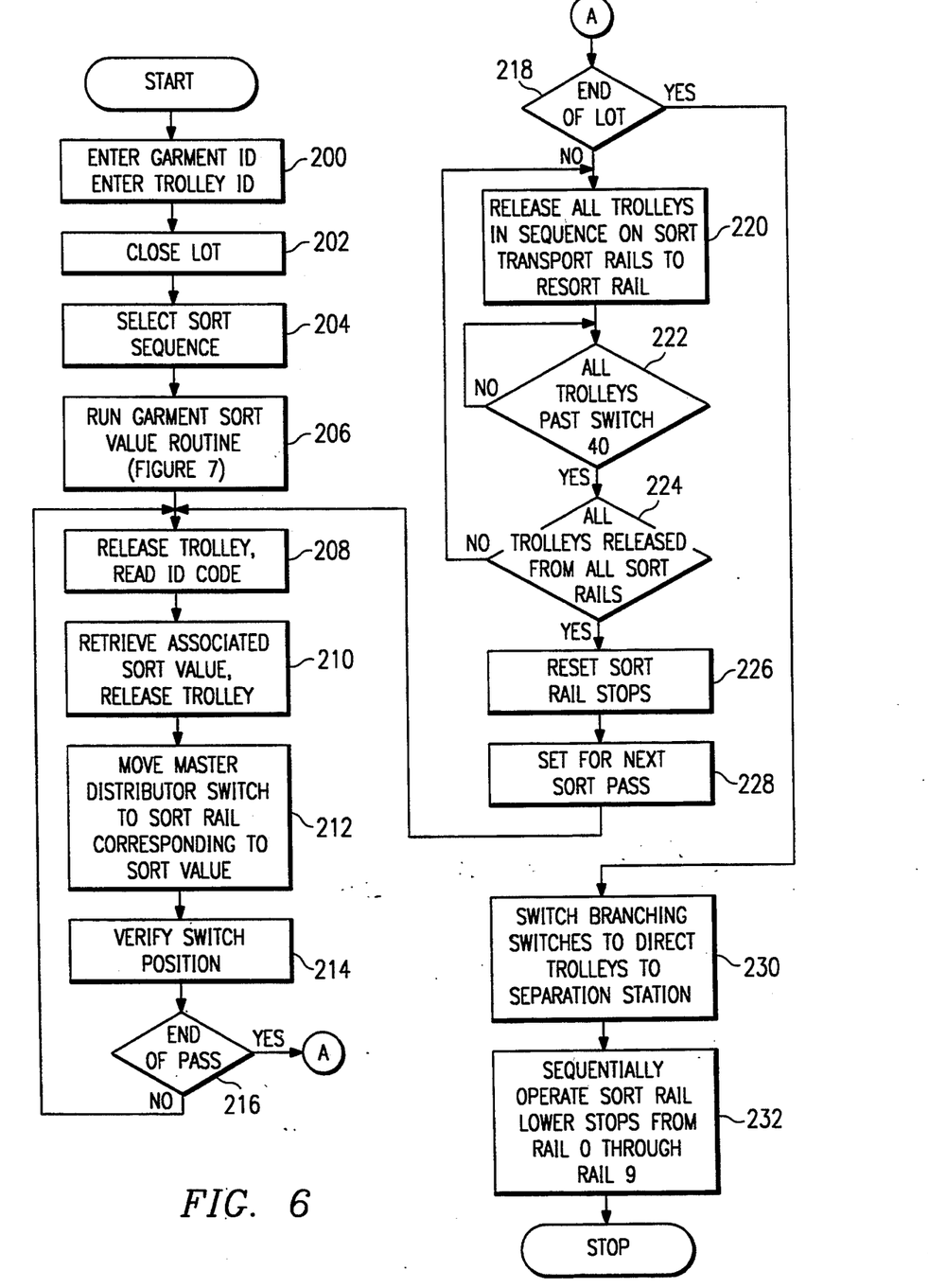
FIG. 6 is a flow chart illustrating the major steps carried out by a sorting system computer for sorting articles according to the invention.

FIG. 6 illustrates a flow diagram of the operations carried out by the computer 14 for sorting garments according to an exemplary sort sequence. It should be understood that other types of sorting programs can be carried out, depending upon the manner in which the computer 14 is programmed. As an alternative to the use of a single computer, different processors can be distributed throughout the sorting system to independently control separate functions or sections of the sorting system. Each such process would be independently programmed with particularized functions, but communicate with each other to carry out the overall sorting function. As yet even another alternative, it is possible to design hard-wired circuits to provide control over the electrical apparatus of the sorting system. With reference to FIG. 1 in conjunction with FIG. 6, an exemplary sort sequence is described below.

Hangered, clean garments of a lot are transferred randomly from the laundry to the input rail 10 and presented to the scan and load station 12. Here, an operator manually transfers each hangered garment from the input rail 10, and hangs it on a trolley 18 or 75, depending on the type of rail system utilized. Then, the operator utilizes the scanner 16 to scan the garment bar code, and then scans the trolley bar code 62. The data of the two bar codes is entered into the computer 14, and an association therebetween is created and maintained throughout the sort operation. This step of the sorting operation is shown generally as reference numeral 200. The operator continues entering the associated garment and trolley identification numbers into the computer 14 until all garments of the lot have been completed. Then, as shown by step 202, the lot is closed, and no more garments are processed by the scan and load station 12 until the sorted garments have been removed from the sorting system.

The operator of the scan and load station 12 next enters by way of the keyboard 15 a signal to commence sorting by selecting a sort sequence. Programmed previously into the computer 14 are records concerning each garment, cross referenced with respect to its unique garment identification number. Accordingly, the computer 14 can refer to such data base records and determine what customer owns the garment and the typical sequence of delivery stops, etc. On the other hand, the operator at the scan and load station 12 can indicate a different delivery schedule or sequence, which is integrated by the computer 14 into the sorting sequence.

Typical garment records are illustrated in Table I below.

TABLE I

| REC | ITEM ID | TYPE | COLOR | ACCT NO. | EMP | ROUTE STOP | SORT SEQ | DEL STOP |
|---|---|---|---|---|---|---|---|---|
| 1 | 123456 | Shirt | Blue | 232 | 3 | 16 | 4 | 1 |
| 2 | 123457 | Pants | Navy | 232 | 3 | 16 | 4 | 1 |
| 3 | 123458 | Jkt | Grey | 210 | 12 | 03 | 12 | 6 |

Records 1 and 2 identify different garments assigned to the same customer, in that the account number is the same and the delivery route stop is the same, although the latter need not be the same. Record 3 identifies a garment owned by a different customer. Importantly, each garment has a different and unique identification number in the computer data base that matches the bar code number on the garment, whether or not assigned to the same or different customers. The customer account number can also be encoded into the bar code label fixed to the garments. Each garment record can also indicate a sort sequence and delivery stop for the particular customer. The sort sequence indicates the particular arrangement of shirts, pants, uniforms, etc. desired by that customer. Obviously, numerous sort sequences can be stored in the computer 14 and all identified with respect to each record. For example, a sort sequence No. 4, may indicate a first type of shirt is to be arranged first, a second type of shirt is to be arranged second, followed by a first and second type of pant, and followed by uniforms, as indicated in FIG. 5 with respect to delivery stop 180. If pants and shirt are to be reversed from the order noted, then a different sequence would be identified in all of the garment records of the customer. In the event that a new customer desires garments arranged in a manner unlike any sort sequence presently stored in the computer 14, then personnel can input a new sort sequence with a particular arrangement of the garments, and identify the new sort sequence with a new number.

In any event, before each garment has passed the scan and load station 12, the computer 14 has a record of each garment and all the pertinent sorting information. However, it should be understood that the garments are in a random serial order when disposed on the entry transport rail 22. Based upon the particular location of each garment within the series of randomly arranged garments on the entry transport rail 22, the computer 14 assigns sort values according to the algorithm shown in FIG. 7.

Figure 7:
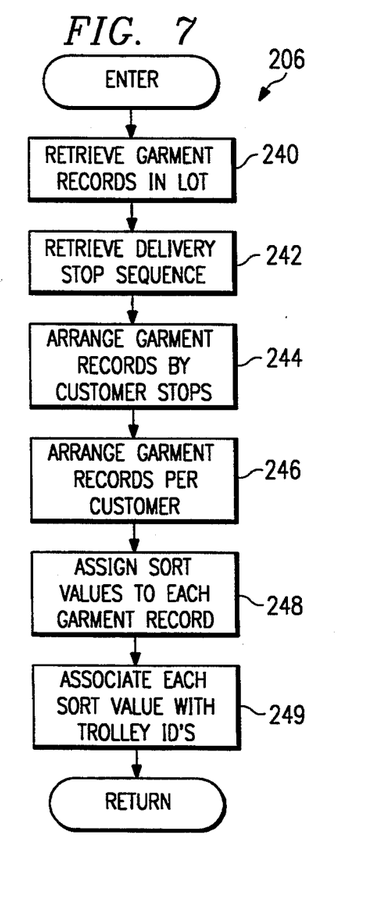
FIG. 7 is a flow chart illustrating the major steps of an algorithm of the preferred embodiment of the invention for assigning sort values to garment trolleys.

With particular reference to FIG. 7, there are shown a series of functional steps 206 carried out by the computer 14 to assign sort values to each garment trolley 18. There are numerous techniques for programming the computer 14 to accomplish the overall assignment of sort values to achieve the result described below. As depicted in step 240, the computer 14 retrieves the record of each garment in the lot. Also, the computer 14 retrieves information, from a table or input by the operator, concerning the delivery stop sequence of a truck delivering the lot of garments. Step 242 depicts this programmed operation. In step 244, the computer 14 arranges the records of each customer stop in the sequence in which the stops are actually made. Next, the records of the garments to be delivered at each such stop are arranged in the manner desired, such as indicated by the garment arrangement of stop number one in FIG. 5. This step corresponds to function block 246 in FIG. 7. This information can be obtained directly from the data base garment records themselves. With the garment records sorted in the manner noted, the computer 14 sequentially assigns each record a sort value in an ascending order, starting with zero for the first garment record of the first stop, and continuing to the last garment record of the last stop (step 248).

The sort values are multi-digit numbers corresponding to a particular base numbering system. For example, "000" is equivalent to "0" in any number base system. However, "101" is a sort value of "one hundred and one" in a base ten system, but is a value "five" in a binary system. The number system base utilized is a function of the number of parallel sorting rails 32 utilized, which aspect will be described more fully below. It should be understood that not all garment records will necessarily have different sort values, but one or more may have the same sort value. The same sort values may be assigned to a group of customer garments which are indeed to be together in the final arrangement, but not necessarily in a specific order. For example, the garment sort values shown in FIG. 5 illustrate that the first two shirts of group 184 are to be together in the front of the delivery stop number one, but either of the two shirts may be in front. Thus, the garment trolleys associated with both shirts of group 184 have the same sort value. On the other hand, and for purposes of example, the uniform garments of group 192, while they are the same type of garment, are desired by the customer to be sorted and arranged in a specific order. Thus, these garments have different sort values. Lastly, the sort values are associated with the respective garment trolley identities, as shown in step 249.

The algorithm 206 of FIG. 7 assigns sort values so that the garments can be sorted in the manner shown in Table II below. In this example, a decimal number base is used in the computer 14 for the sort values and a corresponding ten sorting transport rails 32 are used. As can be seen, if the garment trolleys 18 are sorted on the ten parallel rails 32 such as shown in Table II, and if the frontal garment trolley 18 in each parallel sorting rail 32 is released in a sequence, starting from rail 0 through rail 9, then the garments will be sorted and arranged in a final manner with the sort values in an ascending order.

As noted above, once the sort values are assigned to each garment record, there is a corresponding correlation of the sort values to the trolley identification codes. According to the invention, once garments are entered into the sorting system as being attached to the trolleys 18, the system then responds only to trolley identification numbers, irrespective of the garments or their identification numbers. Once all garments in the lot have been assigned sort values and are in a random order on the entry transport rail 22, the sorting operation continues as described below.

With respect to step 208 of the flow chart shown in FIG. 6, the first rail stop 24 is released and the foremost trolley 18 then becomes stopped by the second rail stop 34. The bar code of the released garment trolley 18 is scanned or read, and is then released by the second rail stop 34 and allowed to proceed. Trolleys in the lot are allowed to stack up behind the upper rail stop 24.

The computer correlates the scanned trolley identification number with the assigned sort value for moving the master distributor switch 30 to allow the garment trolley 18 and attached garment to move by the action of gravity onto the appropriate sort transport rail 32. In the first sorting pass of each garment trolley 18, the least significant digit of the sort value is employed to switch the garment trolley 18 onto the corresponding sort rail 32. In other words, if the sort value of the garment trolley is "002", the least significant digit is "2" and thus sort rail number "2" will be switched in the first pass to the entry transport rail 22 by the master distributor switch 30. The reading of the trolley identification number is shown in step 208, and the retrieval of the corresponding data record and release of the trolley is shown in step 210 of FIG. 6. The master distributor switch 30 is moved, as shown in step 212, while a position verification function is shown in step 214. Position verification can be verified by the use of the microswitch 152.

It should be noted that the upper stop 36 of each downwardly inclined sorting transport rail 32 is initially released so that all garment trolleys pass beyond such stop during the first sorting pass and are stopped by the second or lower rail stops 38.

Step 216 of the sorting routine constitutes a decision to determine if the first pass has been completed. The first sorting pass is completed when all of the garment trolleys have been removed from the transport rail 22 and switched onto one of the parallel sorting transport rails 32. If the negative result arises from the decision step 216, control of the computer 14 returns to step 208, where the next garment trolley is released from the entry transport rail 22, whereupon the entire sequence is again repeated. The next trolley is released, its ID is read and the corresponding sort value is retrieved and the garment trolley is routed to the appropriate sorting transport rail 32, based upon the least significant digit of the sort value. When it is determined that the first pass is completed, as noted in step 216, a second decision step 218 is encountered where it is decided whether or not the entire lot of garments has been sorted. If not, then after the completion of each sorting pass, the lower stop 38 of rail 0 is released, and the switches 40 are switched to route the trolleys to the resort transport rail 26, as shown by step 220. At this time, the upper stop switches 36 are activated so that the commencement of the second sorting pass does not cause garment trolleys to be intermingled with the trolleys of the previous sorting pass. The program step 222 verifies if all of the released garment trolleys from rail 0 have progressed past rail location 43 and onto the resort rail 26, and if so, the lower stop 38 of sorting transport rail 1 is released and all of the trolleys sorted thereon during the first pass proceed to the resort rail 26, and so on until all the garment trolleys from the sorting rails 32 have been rerouted to the resort rail 26.

Importantly, the foremost group of garment trolleys on the resort rail 26 have trolley least significant digits (LSD) of "0", the second group have LSD numbers of "1", and so on to the last group of trolleys on the resort rail 26 which have the LSD number of "9." On release of all the garment trolleys from the sorting transport rails 32, in the order noted, an affirmative decision from step 224 causes the upper stop switches 36 to be released and the lower stop switches to be activated, as noted in step 226.

According to step 228, the second sorting pass is commenced by return to program instructions corresponding to step 208. When the second sorting pass is carried out, the next least significant digit of each sort value is employed. The sequence of sorting passes is continued until all significant digits of the sort values have been exhausted, and the lot is completed. (Step 218).

TABLE IIA (1st Sort Pass)

| Rail 0 | Rail 1 | | Rail 8 | Rail 9 |
|---|---|---|---|---|
| XX0 | XX1 | | XX8 | XX9 |
| . | . | ... | . | . |
| . | . | | . | . |
| . | . | | . | . |
| XX0 | XX1 | | XX8 | XX9 |

TABLE IIB

| Rail 0 | Rail 1 | (2nd Sort Pass)<br>2nd Sort Pass | Rail 8 | Rail 9 |
|---|---|---|---|---|
| X09 | X19 | | X89 | X99 |
| . | . | ... | . | . |
| . | . | | . | . |
| X01 | X11 | | X81 | X91 |
| X00 | X10 | | X80 | X90 |

TABLE IIC

| Rail 0 | Rail 1 | (3rd Sort Pass)<br>3rd Sort Pass | Rail 8 | Rail 9 |
|---|---|---|---|---|
| 099 | 199 | | 899 | 999 |
| . | . | | . | . |
| . | . | | . | . |
| 050 | 150 | ... | 850 | 950 |
| . | . | | . | . |
| . | . | | . | . |
| 001 | 101 | | 801 | 901 |
| 000 | 100 | | 800 | 900 |

Table IIA above illustrates various columns corresponding to the arrangement of the trolleys on the ten sort rails as a result of the first sorting pass. The numbers in the table illustrate the sort values themselves. The garment trolleys having associated sort values with a least significant digit of "0" are distributed onto sorting transport rail "0". The garment trolleys with sort values with a least significant digit of "1" are distributed onto sorting transport rail "1", and so on through rail "9" which holds trolleys and associated sort values with the least significant digit of "9". The rails 0-9 comprise the ten parallel sort rails 32. The "X" shown in the more significant digit positions of each sort value is ignored during the first sorting pass.

Table IIB illustrates the garment trolleys and associated sort values after the second sorting pass. It is to be noted that the next significant digit in each sort value is arranged in ascending order on the respective sorting transport rails 32. The most significant digit is denoted with an "X", as it is ignored in the second sorting pass.

Table IIC illustrates the garment trolley arrangement on the sorting transport rails 32 after the third and final sorting pass in the exemplary ten sorting transport rail system in which a thousand garments can be sorted (0-999). As noted, the third and most significant digit of each sort value is used to arrange the garment trolleys so that the most significant digit, and thus the trolley, is arranged sequentially on the respective sorting transport rail 32 in the third sorting pass. Should more than one trolley have the same sort value, such as the garments in group 184 of FIG. 5, the trolleys would be sorted so as to end up together on the same sorting transport rail 32.

As noted, the foremost garment trolley 18 on each sorting rail 32 can be arranged in the final serial sequence on the exit transport rail 42 when the branching switches 40 (FIG. 1) are sequentially switched so that the garment trolleys on each sorting rail move to the exit transport rail 42. This step is also depicted in program step 230. The movement of the garment trolleys are occasioned by each lower rail stop 38 being sequentially operated to release all the garment trolleys on rail zero, then all the trolleys on rail one, and so on through the garment trolleys on rail nine. These final sorting steps are noted as numeral 232 in the flow chart. Again, should more than one garment trolley have the same sort value, then the such group of trolleys would be released with the other garment trolleys on the sorting rail to proceed together to the separation station.

As described above, the exit transport rail 42 can be of sufficient length to hold in series the finally sorted garment trolleys. At the separation station 44, the hangered garments are removed from the trolleys and loaded in the same sequence on racks and into the delivery trucks. The empty trolleys 18 can then be hooked on the return trolley rail 20 for transport back to the scan and load station 12.

The exemplary article sorting system disclosed above utilizes ten sorting transport rails 32 and three recirculating sort passes of the garment trolleys in order to form a final parallel sort in three sorting passes. This arrangement is effective to sort up to one thousand garment trolleys, each having different sort values. However, when sorting only up to 100 garments, two digit sort values would be automatically assigned by the computer 14, and two passes through the system would be required to form a final parallel sort arrangement. In like manner, in order to sort 10,000 garments on a ten sorting transport rail system, four passes would be required through the system, as necessitated by a four-digit sort value for each garment trolley.

As can be appreciated, while the sort values and number of sorting transport rails correspond to a decimal number system, other numbers of sorting rails and corresponding numbering system can be employed for assigning sort values. For example, if eight sorting transport rails were to be employed, an octal base numbering system would be used to assign sort values. An eight parallel rail system obviously requires less space, but requires more passes to sort an equivalent number of garments. Whatever the number of rails or the corresponding base numbering system employed, the same sorting technique would be used. Indeed, the computer 14 can be programmed to carry out sorting operations using different numbering bases. For example, if one or more of the sorting transport rails 32 is inoperative or otherwise nonfunctional for a period of time, such information can be input into the computer 14. In this instance, the sort values can be associated with a different numbering system, the base of which corresponds to the number of functional sorting transport rails 32.

Figure 8:
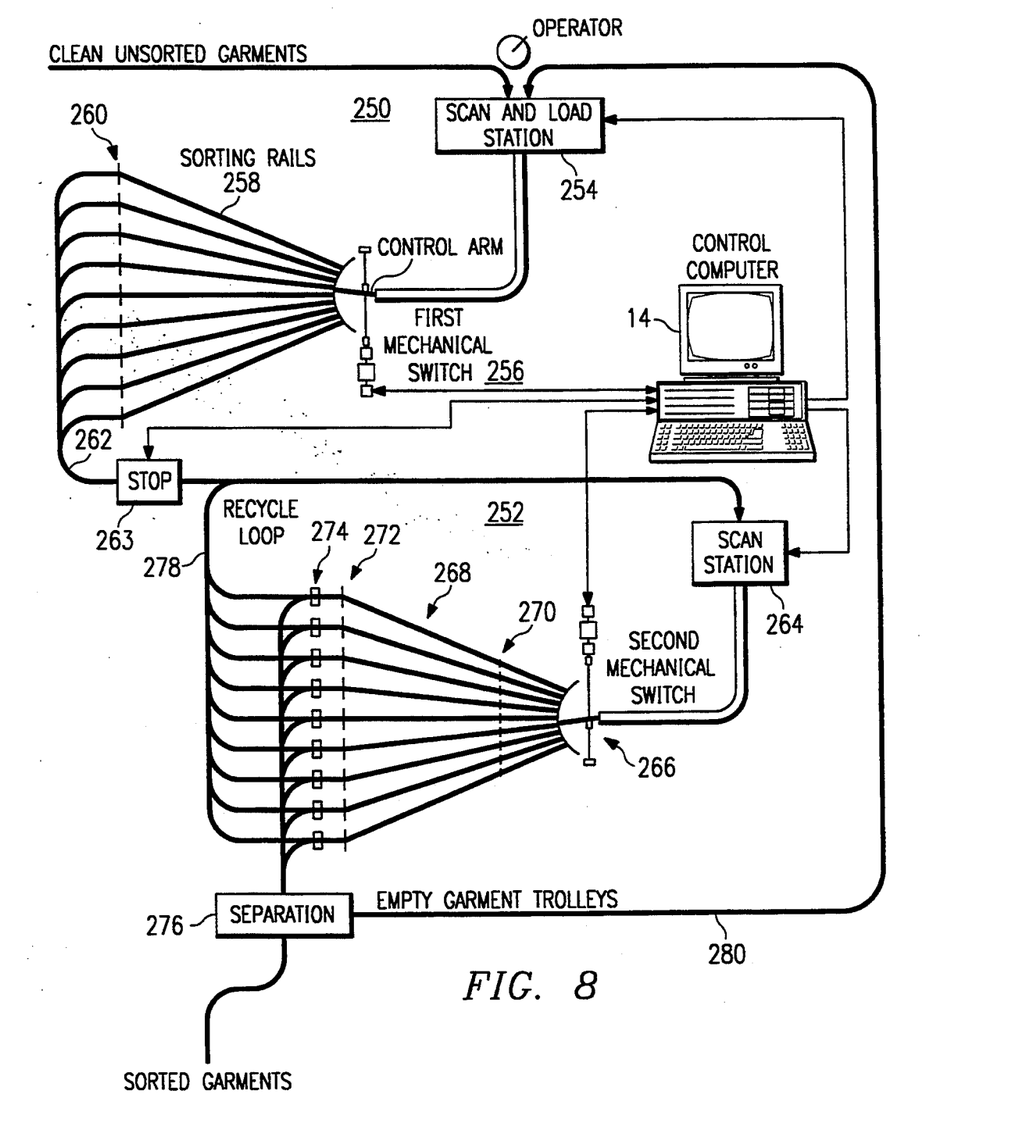
FIG. 8 illustrates a dual sorting system interconnected to enhance sorting operations.

FIG. 8 illustrates in simplified form an article sorting system employing two groups of sorting transport rails, each associated with a master distributor switch. More particularly, shown is a first sorting system 250 for carrying out a first article sort, or a presort, and then transferring the presorted articles to a second sorting system 252. The first sorting system 250 includes a scan and load station 254 similar to that described above in connection with FIG. 1. Various other necessary equipment, such as rail switches and stops are not shown in FIG. 8 for purposes of clarity. The computer 14 controls the entry transport rail 22 so as to release identified garment trolleys to the first master distributor switch 256. The first distributor switch 256 is controlled by the computer 14 to distribute trolleys, and thus garments or articles, onto desired parallel sorting transport rails 258. The sort conducted according to the first set of sorting transport rails 258 can be carried out with respect to a sort criterion, such as delivery routes or article lots. For instance, all the garments for each route can be sorted initially on respective parallel sort rails 258 and stopped by rail stops 260. Delivery route number one can be sorted on one sort rail, route number two on another sorting rail, and so on. As another example, one lot can be sorted on one sorting rail, and other lots separated on the other sorting rails. The stops 260 can then be operated sequentially to release onto an interconnecting rail 262 the garment group to be delivered on the first delivery route. The garment group to the second and subsequent routes can be released in a subsequent and sequential manner to present to the second sorting system 252 garment trolleys which have been presorted as to delivery routes. Of course, other sorting criteria can be carried out by the first sorting system 250.

The computer 14 can be programmed to control the first master distributor switch 256 to sort according to any specified parameter. Because there is no resort transport rail for recirculating garment trolleys with respect to the first sort system 250, such system can only perform a single sorting pass. Of course, by employing a resort transport rail, such as 22 shown in FIG. 1, multiple sorting pass capabilities can be accomplished in the first sorting system 250.

The second sorting system 252 receives presorted trolleys and associated garments on the interconnecting rail 262. The computer 14 can operate rail stop 263 to allow groups of trolleys to be entered into the second sorting system 252. Once the group of trolleys has been entered into the second system 252, the stop 263 can be deactivated, and another group released from one of the sorting transport rails 258. The entered garment trolleys are received by a scan station 264 which scans the identification codes of the garment trolleys. The trolleys are released to a second master distributor switch 266 which is also controlled by the computer 14. The second master distributor switch 266 can complete the sorting sequence according to other criterion, such as delivery stops, the type of garments, color, etc. The second group of parallel sorting transport rails 268 each includes an upper stop 270 and lower stop 272, as well as a branching switch 274. The switches 274 are operative to transfer garment trolleys to either a separation station 276 or a resort transport rail 278 which recirculates garment trolleys to the scan station 264 to commence additional sorting passes through the second sorting system 252. An empty trolley rail 280 can be utilized to return empty garment trolleys to the scan and load station 254 associated with the first sorting system 250.

One advantage of the sorting system illustrated in FIG. 8 is that two independent lots can be involved in sorting sequences at the same time. For example, when presorted garment trolleys are transferred via the interconnecting rail 262 to the second sorting system 252, garment trolleys and associated garments of another lot can be sorted on the first sorting transport rails 258 and held there by the switches 260. When the previous lot of garment trolleys has been finally sorted by system 252 and transferred to the separation station 276, the presorted lot held on the sorting transport rails 258 can then be sequentially released one at a time from the first system 250 and the sorting operation completed by the second sorting system 252.

From the foregoing, disclosed is an article sorting system particularly well adapted for sorting garments. The sorting system of the invention receives unsorted, but identified garments and associated trolleys, and assigns sort values thereto. The garments are distributed amongst parallel sorting transport rails according to digit value of the assigned sort values, and are recirculated in such system for subsequent sorting passes until all the sort value digits have been employed. The garment trolleys are then held in the sorting transport system for release in a final serial sorting order to a separation station. According to an important feature of the invention, the garment trolleys which progress through the sorting system maintain a unique identity and are reidentified at various locations in the sorting system to determine routing direction by a distributor switch. The garments having been initially uniquely associated with the respective trolleys are thus sorted according to predefined criteria maintained in a computer control. Another advantage of the sorting system of the invention is that the capacity is limited to the length of the various rails. Yet another advantage of the sorting system is the versatility in altering or selecting the sort criteria, and to accommodate various numbers of parallel sorting rails to optimize space and/or cost constraints.

While the preferred and other embodiments of the invention have been disclosed with reference to specific sorting methods, apparatus and algorithms, it is to be understood that many changes in detail may be made as a matter of engineering choices without departing from the spirit and scope of the invention, as defined by the appended claims.

We claim:

1. A transport carrier for use in an article sorting system having transport rails for transporting a plurality said carriers, comprising:
   a frame member;
   a hook fixed to said frame member for hanging said transport carrier from the transport rails so that the carrier can be moved along the transport rails; and
   a plurality of fingers fixed to said frame and aligned to form a receiving area for removably securing an article hanger, said fingers comprising at least one forefinger and one aft finger with the forefinger being shorter than the aft finger to facilitate placement of the hanger into the receiving area and said fingers having reduced thickness at the receiving area to facilitate placement of the article hanger, wherein the plurality of fingers are aligned in parallel, said forefingers are aligned in a first width-wise plane, said aft fingers are aligned in a second width-wise plane, and said plurality of fingers are each aligned in separate thickness-wise planes, said first width-wise plane being offset from said second width-wise plane to form the receiving area.

2. The transport carrier of claim 1, wherein a nipple is formed on at least one of the fingers for securing the hanger in the receiving area.

3. A transport carrier for use in an article sorting system having transport rails, including at least screw-type conveyor rails, for transporting a plurality of said carriers, comprising:
   a frame member;
   a hook fixed to said frame member for engagement with the transport rails so that the carrier can be moved along the transport rails, wherein the hook comprises an apex which is narrower in thickness than the thickness of the frame for enabling ease of mechanical separation of the carriers; and
   a connector fixed to said frame for removably attaching an article to said transport carrier.

4. A transport carrier for use in an article sorting system of the type having a transport rail for movement of plural said carriers, comprising:
   a hook for engagement with the transport rail, said hook having a smaller thickness at its apex than the thickness of the rest of the carrier;
   a connector attached to the hook, comprising a plurality of fingers, including at least one forefinger and one aft finger, aligned to form a receiving area for removably securing an article to said transport carrier; and
   a unique identification associated with each said carrier to differentiate one said carrier from another.

* * * * *